United States Patent [19]

Ray, III

[11] 4,324,823

[45] Apr. 13, 1982

[54] SELECTIVE TAMPER RESISTANCE FOR ON-PACKAGE PEELABLE PREMIUMS

[75] Inventor: George C. Ray, III, Battle Creek, Mich.

[73] Assignee: General Foods Corporation, White Plains, N.Y.

[21] Appl. No.: 224,720

[22] Filed: Jan. 13, 1981

[51] Int. Cl.³ .......................... G09F 3/00; B32B 3/00; B32B 27/14

[52] U.S. Cl. ........................................ 428/43; 40/312; 428/40; 428/194; 428/198; 428/202

[58] Field of Search ...................... 40/312; 428/40, 41, 428/42, 43, 194, 198, 201, 202

[56] References Cited

U.S. PATENT DOCUMENTS

| | | | |
|---|---|---|---|
| 1,004,055 | 9/1911 | Martin et al. | 40/306 |
| 3,110,121 | 11/1963 | Corrinet | 40/306 |
| 3,335,937 | 8/1967 | Kramer | 40/312 |
| 3,524,782 | 8/1970 | Buske | 428/43 |
| 3,822,492 | 7/1974 | Cawley | 428/41 |
| 3,835,564 | 9/1974 | Gottschalk | 40/306 |
| 3,958,744 | 5/1976 | Herglotz | 229/6 R |
| 4,128,954 | 12/1978 | White | 40/312 |
| 4,281,762 | 8/1981 | Hattemer | 428/42 |

*Primary Examiner*—William R. Dixon, Jr.
*Attorney, Agent, or Firm*—C. Garman Hubbard; Bruno P. Struzzi; Thomas V. Sullivan

[57] ABSTRACT

A laminated carton comprising a paper board substrate and an outer paper ply including a peelable section in the paper ply defined by a perforated tear outline providing a leading edge, said ply being bonded to the substrate by a water soluble laminant coated with a release agent in a pattern which includes voids in the coating at said leading edge, said voids being shaped to provide variable adhesive bond between said plies as peeling of said section is initiated after application of moisture to the area of said leading edge to dissolve said laminant at said voids.

12 Claims, 5 Drawing Figures

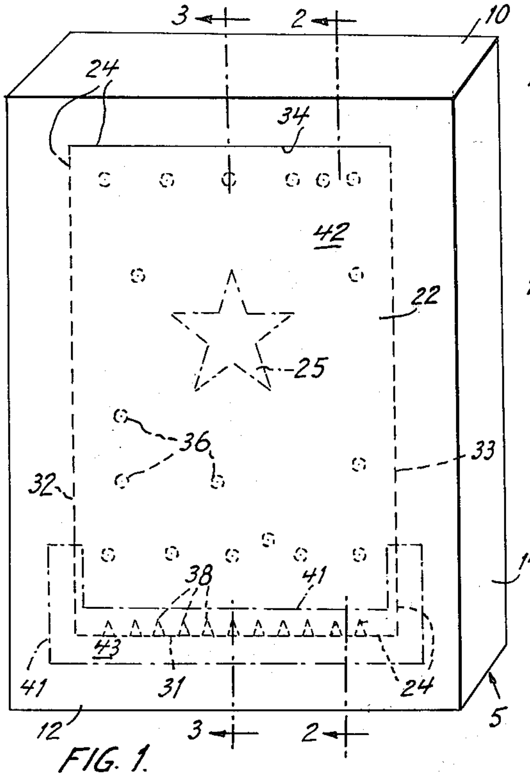
FIG. 1.
FIG. 2.
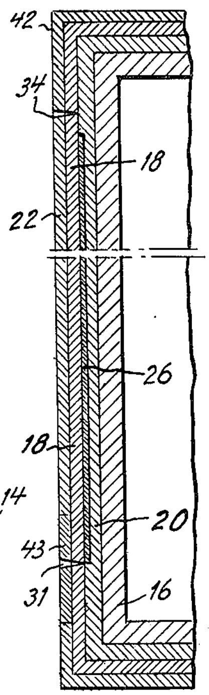
FIG. 3.
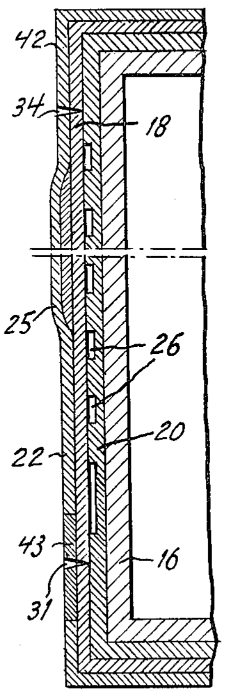
FIG. 5.
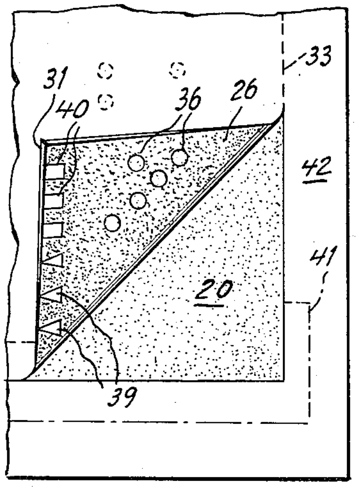
FIG. 4.
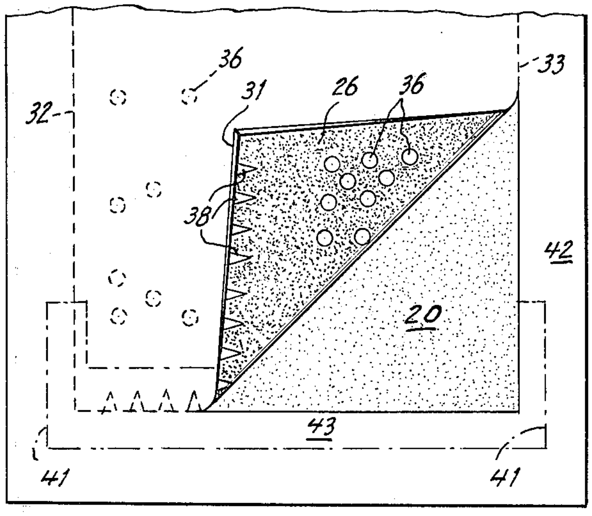

SELECTIVE TAMPER RESISTANCE FOR ON-PACKAGE PEELABLE PREMIUMS

BACKGROUND OF THE INVENTION

1. Field of the Invention

This invention relates generally to laminated web material of the type useable in packaging and convertible into various types of containers such as cartons or the like suitable for the packaging of consumer products. More particularly, the invention relates to containers made from laminated packaging material of this character which are so constructed as to enable a selected area of the outer ply of the material to be readily peeled from or separated with respect to an underlying ply of the material, by the consumer or ultimate purchaser of the product so packaged, without significantly affecting the structural integrity of the container.

It is now a widespread practice in the marketing of packaged consumer oriented products to offer with the package, as an inducement to purchase, a promotional item or premium which may take the form of a coupon, trading stamp, picture or the like. These items have traditionally been attached in some way to the exterior of the package or inserted in the container in connection with the filling operation. Also, in the case of printed materials such as coupons, they have been printed on the surface of the carton or container with intent that they be cut out from the structure to enable redemption thereof. The above-mentioned methods of incorporating coupons or the like with packaged goods have involved certain disadvantages whether it be pilferage of the coupon in cases where they are externally attached to the package, inadvertant failure to stuff the coupon in cases where they are inserted within the package, or destruction of the carton itself as an incident to redemption in those instances where the coupons are printed directly on the surface of the packaging material from which the cartons or containers are constructed.

More recently there has been developed and introduced into the marketplace a carton construction employing laminated packaging material such as, for example, paper laminated to paper board, wherein the premium item such as a coupon or the like is printed on a predetermined section of the outer paper ply, preferably within one panel of the carton, which section furthermore is substantially unadhered to the paperboard substrate and is defined by lines of weakening such as perforated tear lines or the like so as to be readily removeable from the carton by a peeling action without significantly impairing the structural integrity of the container. There has developed, however, since the introduction of this form of removeable coupon a considerable and growing amount of unauthorized misuse and illegal pilferage of coupons of this type due to their ease of removal from the carton structure, and this occurs mainly in retail establishments whereat said products are displayed for sale to the consumer. Means have been developed to render coupons of this type tamper resistant or at least to render the illegal removeable of a coupon from a carton on the shelf of a retail establishment more difficult, such as by requiring application thereto of peel implementing means not normally available in such areas, and a tamper resistant concept of this nature is disclosed in a pending application identified hereinbelow and of common ownership herewith. The present invention represents what is considered to be an improvement upon the teaching disclosed in said pending application.

2. Description of the Prior Art

In U.S. Pat. to Martin et al. No. 1,004,055 issued Sept. 26, 1911, there is disclosed a container in the form of a rigid can having a label affixed thereto and including as an integral portion thereof a trading stamp. Such stamp is bounded by a perforated line including a tab to enable the stamp to be removed from the label without otherwise impairing the label or the container to which it is affixed. A somewhat similar construction is disclosed in the patent of Gottschalk U.S. Pat. No. 3,835,564 issued Sept. 17, 1974. In this patent a portion of the label affixed to a rigid can includes a decal bordered by a perforated line which enables the decal to be removed from the label without otherwise impairing the label or the container. In both of said above-referenced patents the peelable portions of the label are removeable without requiring any preconditioning whatsoever, thereby rendering the respective structures susceptible to tampering and illegal removal of the premium portion by unauthorized persons.

U.S. Pat. to Corrinet No. 3,110,121 issued Nov. 12, 1963, discloses a coupon embodied in the outer wrap or label for a tubular container, which coupon is bordered on three sides by a perforated tear line with its fourth side constituting a portion of the edge of the outer wrap so as to enable easy grasping thereof to start the peeling action. The structure of this reference is designed to enable easy grasping and removal of the peelable coupon portion, thus also rendering it susceptible to tampering and illegal removal by unintended or unauthorized persons.

U.S. Pat. to Herglotz No. 3,958,744 issued May 25, 1976, also discloses an on-package peelable coupon. However, the packaging material is not a laminate of paper and board, and peelability relies in the separability of the fibers of the paper board, per se.

Also, there is pending in the United States Patent Office three applications of common ownership herewith, Price et al. Ser. No. 836,873 filed Sept. 26, 1977; Ray, III et al. Ser. No. 2,701 filed Jan. 10, 1979; and Otto Ser. No. 139,045 filed Apr. 10, 1980. Each of said three pending applications discloses a carton structure made from laminated packaging material, the first mentioned application disclosing a readily peelable coupon or the like in the outer ply of the laminated material entirely within one panel thereof so as to be completely enclosed by a tear outline. In the second of the above-mentioned applications, the construction is somewhat similar to the first mentioned as to peelability, but the removeable portion of the outer ply contains a decorative image printed in sublimation ink so as to enable transfer of said image to another article as an "iron-on" under suitable application of heat and pressure. In the third of the above-mentioned pending applications which is the application mentioned in the preceding paragraph of this application, tamper resistance it achieved by designing the tear outline to have only one starting point which is in the form of a pull tab, and the laminant employed in the structure is a water soluble adhesive. The release agent applied to enable separability of the outer ply is in a pattern which excludes the pull tab area of the coupon thus leaving the tab firmly adhered to the substrate by the water soluble adhesive. The structure requires that the pull tab area be moistened with water or the like which upon penetrating through to the adhesive enables the tab area to be separated from the substrate by dissolution of the adhesive to start the tearing action which then proceeds in the usual way by virtue of the release coating on the remaining surface of the coupon.

SUMMARY OF THE INVENTION

The present invention utilizes the concept disclosed in the aforesaid pending application to Otto, with respect to the use of a water soluble adhesive as the laminant for adhering the paper ply to the board ply of the container structure, and also to the tear line configuration requiring that the start of the tear originate at a predetermined portion thereof. In the present instance, the tear outline may be a true rectangular configuration and one side thereof, preferably a shorter side, is designated as the starting edge for initiation of the peeling action, said starting edge having no "pull tab" protrusion as in the aforesaid pending application but being disposed within a window area of the outer paper ply devoid of the outer water resistant coating and bordering said starting edge on both side thereof, which window area must be preconditioned by application of moisture thereto in its entirety before the peeling of the coupon can be initiated. Thus, as distinct from the concept of said pending application of Otto Ser. No. 139,045, sufficient moisture must be applied to solubilize the adhesive effective along the entire leading edge rather than just on a tab portion of the leading edge.

Furthermore, the amount of moisture required to free or delaminate the leading edge can readily be controlled both by the pattern of the release coating applied at the leading edge area of the coupon and also the nature of the outer protective coating applied to the window area of the outer paper ply which, acting as a sizing agent, determines the degree of water penetration effective at the window area and at the same time serves as a controllable means for imparting wet strength characteristics to the window area of the outer paper ply of the structure. The concept allows for wide flexibility in the choice of web materials for use as the outer ply since, by providing a window area at the critical leading edge of the coupon portion of the outer ply, the water permeability as well as the wet strength characteristics of said area can be adjusted modified by application of appropriate coating substances to the said window area. Of course, areas of the outer ply outside the window area would normally be treated with a completely water resistant coating at the same time so that the application of moisture or water to the window area as a preliminary necessary condition to the start of the peeling action cannot result in inadvertant application of moisture to the remaining areas of the container which could be destructive of its continuing integrity.

The patterns that may be employed in application of release coat to the leading edge area of the coupon can range from ones wherein the adhesive bond is stronger at the leading edge than at areas beyond the leading edge or, vice versa, weaker at the leading edge than at the interior areas, or even the same bond strength at the leading edge and as the tear proceeds interiorally from the leading edge. The choice of which pattern of release coating to apply would depend upon the nature of the materials employed as well as the type of coating required to adjust the water penetration of the outer ply in the window area thereof, all in relation to the bonding strength desired.

It is, therefore, an object of this invention to improve the peelability characteristics of peelable coupons or the like incorporated in structures of laminated materials such as carton, containers or the like.

It is a further object of this invention to provide a peelable coupon on a laminated container which can have varying degrees of peelability, especially at the start of peelability, to hinder the ability to tamper therewith.

It is a still further object of this invention to provide a peelable coupon for a laminated container in which the ability to peel the coupon and ease thereof can be readily controlled by application of varying patterns of release coating to the underside thereof at the starting edge along with application of varying sizing materials to the outer side thereof at said leading edge.

Other objects of the invention together with the features contributing thereto and advantages accruing therefrom will be apparent from the following description when read in conjunction with the drawing in which:

BRIEF DESCRIPTION OF THE DRAWING

FIG. 1 is a perspective view of a laminated carton showing a peelable coupon according to the instant invention and incorporated in one panel thereof.

FIG. 2 is a sectional view taken along line 2—2 of FIG. 1 showing the various laminae in exaggerated thickness.

FIG. 3 is a similar sectional view taken along line 3—3 of FIG. 1.

FIG. 4 is a detailed enlarged view of a portion of FIG. 1 showing a corner of the coupon delaminated at the start of the peeling action of said coupon.

FIG. 5 is a detailed view similar to FIG. 4 but showing a different pattern of release coating applied to the underside of the peelable coupon.

DETAILED DESCRIPTION

Referring now to the drawing, the invention is shown in embodiments incorporated in an otherwise conventional folding carton 5 of the type commonly employed for containing consumer oriented products such as manufactured food items, for example, cereals, crackers, pet foods or the like. Said carton as shown in the perspective view of FIG. 1 includes a top closure flap 10, a side wall panel 12, which for purposes of this description may be considered the rear panel of the carton, and an end wall panel 14.

The carton is manufactured from webs of packaging material which are laminated together and include, as can be seen in FIGS. 2 and 3, an inner ply 16 constituting a bendable grade of paper board or the like and an outer ply 18 of high grade paper of a quality suitable for receiving the printing of the usual carton graphics, labeling, product identification etc. and bonded to the substrate paperboard ply by a laminant 20.

Incorporated in the rear panel of the carton is a removeable or peelable section 22 which is defined by a tear outline 24. The removeable section 22 of the rear carton panel may contain a decorative image 25 printed in sublimation ink so as to be transferable to another article as a "iron-on" by application thereto of suitable heat and pressure. Thus, the removeable section 22, having been given to the consumer as an integral part of the package of purchased merchandise and having a value or utility in and of itself when separated from said package, constitutes a form of merchandising premium which is in common usage for sales promotion purposes. It will, of course, be understood that the removeable section 22 of the rear panel may be treated or printed with indicia or designs in inks which are not transferable so as to produce another form of peelable premium, for example, said peelable section could be printed to represent a replica of the well-known work of art, a trading stamp or a cents-off coupon redeemable towards purchase of either the same or other merchandise of the manufacturer.

Accordingly, by use of the terms "premium" and "coupon" it is intended to refer to all such forms of instrumentalities which have a value or utility for the consumer, when removed from the container or carton, which is separate and distinct from its usefulness as a portion of the carton structure for the purchased merchandise.

It will, of course, be recognized that in order to permit ply separation between the peelable section or coupon 22 of the outer paper ply 18 and the paper board substrate 16, provision must be made during the laminating stage of manufacture to prevent substantial adhesive bonding between the section 22 of the paper ply and the substrate 16. This may be achieved in various ways, but a preferred way is to apply to the backside of the peelable section 22, or at least a major portion thereof, an adhesive repellant or release coating 26 which can be readily applied to the backside of the paper ply in the desired pattern during the printing of the outer ply. Said release coating or adhesive repellant agent could be a paraffin wax or microcrystalline wax or any such medium which will resist adherance to the laminating adhesive 20. In the disclosure of the aforesaid pending application of Otto, Ser. No. 139,045, the tear outline of the coupon is designed to have a starting edge which includes a protuberance or pull tab which is devoid of a release coating on the underside thereof so as to be bonded to the substrate by the water soluble laminant therein employed and be separable from the substrate upon application of moisture thereto. Substantially the entire are of the coupon, exclusive of the pull tab portion thereof, is coated with the release agent so that peelability thereof can be achieved merely by application of moisture to the pull tab area. Since the amount of moisture required to release or free the pull tab area could be derived, in an effort to illegally tamper therewith, by application of minor amounts of moisture such as saliva of the transgressor at the point of sale, the construction did not afford sufficient resistance to tampering to fulfill its objective.

In accordance with the present invention, the tear outline 24 of the peelable coupon which may be rectangular in configuration includes a leading edge 31 comprised of perforations or discontinuous cuts extending between the side edges 32, 33 also comprised of perforations or discontinuous slits running to a trailing edge 34 which preferably comprises a continuous slit extending between the side edges 32, 33. In the present construction the entire leading edge 31 of the peelable coupon portion is bonded to the substrate except for spaced portions thereof to which the release coat has been applied in a predetermined pattern.

The release coat 26 is applied to the underside of the coupon portion of the outer ply 18 in a continuous pattern except for voids which over the major surface of the coupon may take the form of dots 36 which are of an area and spaced from one another a distance so as to provide a desired amount of limited adherance between the coupon and the substrate and voids 38 spaced along the leading edge 31 of the coupon and of a triangular or saw tooth shape to provide a predetermined amount of adherance of the coupon portion 22 to the board substrate 16 at the leading edge of the coupon. In the release coat pattern illustrated in FIG. 4, the voids 38 are triangular and of a saw tooth pattern along the leading edge 31 with the apex of the individual voids being inwards of the edge with the result that adherance of the coupon to the substrate by reason of the release coat pattern is greater at the edge of the coupon and progressively reduces as the leading edge is peeled away beyond the area of the void with the adherance progressively diminishing by reason of the configuration of the pattern. This is a preferred release coat pattern configuration to resist unauthorized tampering with the coupon since adherance of the coupon to the board is at its maximum along the leading edge area at the precise edge itself and gradually reduces to minimize tears and needless stress as the peeling progresses.

The area of the outer ply bordering the leading edge 31 constitutes a window defined by imaginary lines 41. As shown, the window area may embrace not only the leading edge 31 of the coupon but also a portion of side edges 32, 33. The window area defined by lines 41 represents a void in a top coating 42 applied to the entire panel of the carton which may comprise a resinous water repellant material such as styrene, acrylic, etc. prepared in the form of a lacquer or over coat varnish so as to prevent water or moisture penetration of the major portion of the outer paper ply when moisture is applied at the window area to solubilize the water soluble adhesive at the starting edge of the coupon which is within the window area.

Preferably the window area defined by the imaginary dot dash lines 41 and representing a void in the application of the top outer water resistant coating is covered with a variable coating which may be of pigmented or clear ink or the like and adjusted in weight to impart a degree of control to the penetration of applied moisture at the window area. This coating acts as a sizing agent and additionally can impart varying degrees of wet strength properties to the paper in the window area.

As previously mentioned, variability in the degree of adhesive bond between the coupon 22 and the substrate board 16 is achieved by the particular pattern in which the release coat 26 is applied to the underside of the coupon. FIG. 4 shows one pattern wherein the pattern of release coating at the leading edge 31 comprises a series of spaced voids 38 in the shape or saw teeth or triangles pointed inwardly so that after the leading edge of the coupon is moistened to substantially dissolve the water soluble adhesive effective in said void areas, the separable bonding at the start of the peeling action is greater at the leading edge and gradually diminishes as the peeling continues to a point where preferably there is a limited surface area completely coated with the release agent and therefore non-binding. Thereafter as the peeling continues a selective and limited extent of bonding is provided by the spaced voids 36 in the release pattern which extend over the major ara of the coupon and under the area of the transferable image 25 in order to prevent blistering or ballooning of the major portion of the coupon during manufacture and subsequent handling. The pattern of release coating illustrated in FIG. 4 is one which provides satisfactory tamper resistance since the degree of adhesion is greatest at the exact or precise starting edge and gradually diminishes as the peeling continues to thereby minimize tearing of the coupon at this stage of removal.

Other patterns of release coating are illustrated in FIG. 5 which in the interest of conciseness in disclosure illustrate two different shaped voids at the leading edge, one being a reverse saw tooth or triangular void 39 and the other being rectangular or parallel bar voids 40 which preferably would be used exclusively of one another but could be used in combination if desired. In the case of the reverse saw tooth voids 39, the adhesive bonding is less at the precise starting edge 31 than as the peeling continues into the non-bonding area, and this pattern may be desired in certain applications dependent upon the materials employed and the degree of tamper resistance desired. In the case of the rectangular or parallel bar voids 40 the degree of bonding remains constant from the start of the peeling action at the leading edge and as it continues into the completely unbonded area coated with or by the continuous release coat. Again, this pattern may be preferred in certain applications depending upon materials employed and the degree of tamper resistance desired.

Preferably, as in the aforesaid pending application Ser. No. 2,701, the release coat pattern while extending across the width of the coupon between the side edges 32, 33 stops slightly short of the trailing edge 34 of the coupon which is adhered to the substrate board by the laminant 20 requiring that the final separation of the coupon in the border area of the trailing edge be accomplished through fiber separation of the coupon itself. This has the effect of giving the trailing edge a clean cut appearance since the cut of the trailing edge is continuous and completely through the paper ply thereby avoiding the attachment of fibrous strands to the trailing edge as otherwise could occur.

It should be understood that the coating which is applied, preferably in conjunction with printing of the coupon, to the window area defined by the lines 41 is a water permeable substance which may be clear or pigmented ink and acts as a size coating which can be varied in weight so as to control the penetration rate of water applied to said window area and also to import desired wet strength characteristics to the paper at said area to insure its integrity.

From the foregoing it will be apparent that by the practice of the invention, through the particular release coat pattern applied at the leading edge of the coupon by itself or in conjunction with the type of size coating applied to the window area, the force required to remove the panel in the critical window area can be controlled and varied as need be to more closely match the physical properties of paper that is used for the removeable coupon portion. Furthermore, the concept herein disclosed improves the reliability of coupon removal in addition to permitting the use of wider range of materials for the removable coupon portion.

While there has been shown and described what are considered to be preferred embodiments of the invention it, of course, should be understood that modification in form and detail could readily be made without departing from the spirit of the invention. It is therefore intended that the invention be not limited to the exact form and details herein shown and described nor to anything less than the whole of the invention herein disclosed as hereinafter claimed.

What is claimed is:

1. In a container formed from laminated packaging material which comprises a relatively rigid substrate and a more pliable outer ply adhered thereto by a water soluble laminant and including a section manually removeable therefrom, said section having utility, per se, apart from said container and being defined by a tear outline comprising a series of cuts through said outer ply in a configuration having a starting edge for initiating peeling action and an oppositely disposed trailing edge interconnected with said starting edge by opposed side edges, a release coating applied between the underside of said section and said laminant in a pattern to render areas of said section non-adherent to said substrate, said pattern defining voids in said release coating spaced apart and extending along said starting edge enabling adherance of said section to said substrate at said voids, said voids being in shapes enabling selected degrees of bonding between said section and said substrate as peeling of said section progresses from said leading edge into the interior areas upon application of moisture to the exterior surface of said section at said leading edge.

2. The invention according to claim 1 including a coating of water resistant material applied to the outer surface of said outer ply, said water resistant coating being applied in a pattern defining a window which is devoid of said water resistant coating, said window being disposed along the border area of said leading edge of said section to enable application of moisture to said leading edge area preliminarily to the peeling of said section from said substrate.

3. The invention according to claim 2 wherein the outer area of said outer ply defined by said window is coated with a sizing agent permitting selected water permeability of said outer ply at said window.

4. The invention according to claim 1 wherein said release coat is applied in a saw tooth pattern extending along said leading edge of said coupon.

5. The invention according to claim 4 wherein the teeth of said saw tooth pattern which define voids in said release coat are oriented with their maximum width at said leading edge.

6. The invention according to claim 4 wherein the teeth of said saw tooth pattern which define voids in said release coat are oriented with their minimum width at the leading edge of said coupon.

7. The invention according to claim 1 wherein the voids in said pattern are rectangular and extend interiorly from said leading edge.

8. The invention according to claim 1 wherein the major portion of said release coat pattern interiorly of said leading edge includes spaced voids providing a predetermined degree of adherence between said outer ply and said substrate over the major area thereof.

9. The invention according to claim 8 wherein the pattern of said release coat includes an area interiorly of said leading edge and disposed between the voids along said leading edge and the voids over the major portion of said pattern, which interior area of the pattern constitutes a continuous application of release coating.

10. The invention according to claim 1 wherein said release coating is applied in a pattern exclusive of the border area of said trailing edge, said trailing edge being defined by a continuous cut extending between the side edges of said section.

11. In a carton constructed from laminated packaging material which comprises a substrate of paperboard and an outer ply of paper adhered thereto by a water soluble laminant and including a section manually removable therefrom, said section having utility, per se, apart from said container and being defined by a tear outline comprising a series of cuts through said paper in a configuration having a starting edge for initiating peeling action and an oppositely disposed trailing edge interconnected with said starting edge by opposed side edges, a release coating applied between the underside of said section and said laminant in a pattern rendering predetermined areas of said section non-adherent to said substrate, said pattern defining spaced apart voids in said release coating extending along said starting edge enabling selective adherence of said section to said substrate at said voids, said voids being in predetermined shapes enabling variable degrees of bonding between said section and said substrate as peeling of said section progresses from said leading edge into the interior areas thereof, and a water resistant coating applied to the outer surface of said paper in a pattern defining a void window area bounding said leading edge and enabling application of moisture to the area of said leading edge to dissolve said laminant at said leading edge voids preparatory to the peeling of said section from said structure.

12. The invention according to claim 11 wherein the outer surface of said paper ply at said window area is coated with a sizing agent enabling a selective rate of water permeability of said outer paper ply at said window area.

* * * * *